United States Patent [19]
Jones et al.

[11] Patent Number: 6,095,206
[45] Date of Patent: Aug. 1, 2000

[54] AUTOMATIC LIQUID FILLING DEVICE AND METHOD OF FILLING TO A PREDETERMINED LEVEL

[75] Inventors: William E. M. Jones, #A6 Waters Edge, Ocean Hill Boulevard, Freeport, Bahamas; Trevor Alden, King of Prussia; Anatoly Galperin, Philadelphia, both of Pa.

[73] Assignee: William E. M. Jones, Freeport, Bahamas

[21] Appl. No.: 09/442,546

[22] Filed: Nov. 18, 1999

Related U.S. Application Data

[60] Provisional application No. 60/108,970, Nov. 18, 1998.

[51] Int. Cl.[7] .......................................................... B65B 3/04

[52] U.S. Cl. .................................. 141/198; 141/1; 141/35; 141/242; 137/428

[58] Field of Search ..................................... 141/1, 5, 198, 141/237, 242–245, 35; 137/428

[56] References Cited

U.S. PATENT DOCUMENTS

| | | | |
|---|---|---|---|
| 2,767,552 | 10/1956 | Clute | 137/428 |
| 4,527,593 | 7/1985 | Campau | 141/198 |
| 4,544,004 | 10/1985 | Fitter et al. | 141/198 |
| 5,002,100 | 3/1991 | Frederick | 141/35 |
| 5,678,615 | 10/1997 | Hughes | 141/198 |

*Primary Examiner*—J. Casimer Jacyna
*Attorney, Agent, or Firm*—Synnestvedt & Lechner LLP

[57] ABSTRACT

A method and device for filling a container with liquid up to a predetermined level. The device includes a cylinder and a piston movable within the cylinder between a rest position and a fill position. A supply of liquid for filling the container is provided to a first end of the piston at alternating pressures to cycle the piston back and forth between the rest and fill positions. Each time the piston reaches its fill position, supply liquid is added to the container. With each cycle the device draws fluid from the container and then attempts to compress the drawn fluid with a second end of the piston. When the fluid drawn is gas, the piston can compress the gas to continue moving to the fill position. When the drawn fluid is liquid, the piston can not compress the liquid and thus is stopped to prevent further filling.

26 Claims, 11 Drawing Sheets

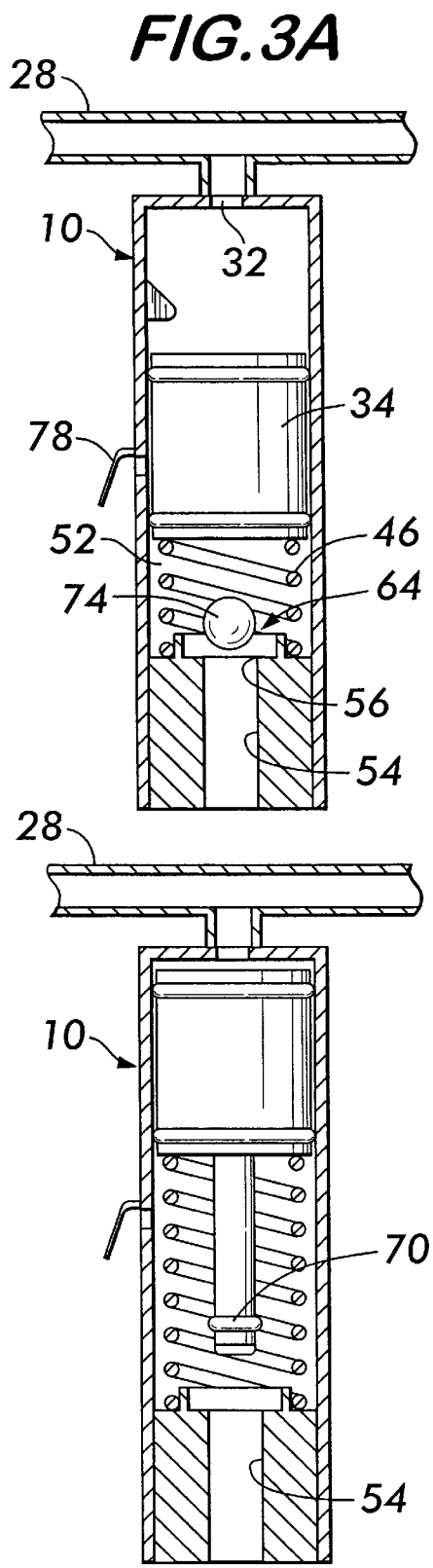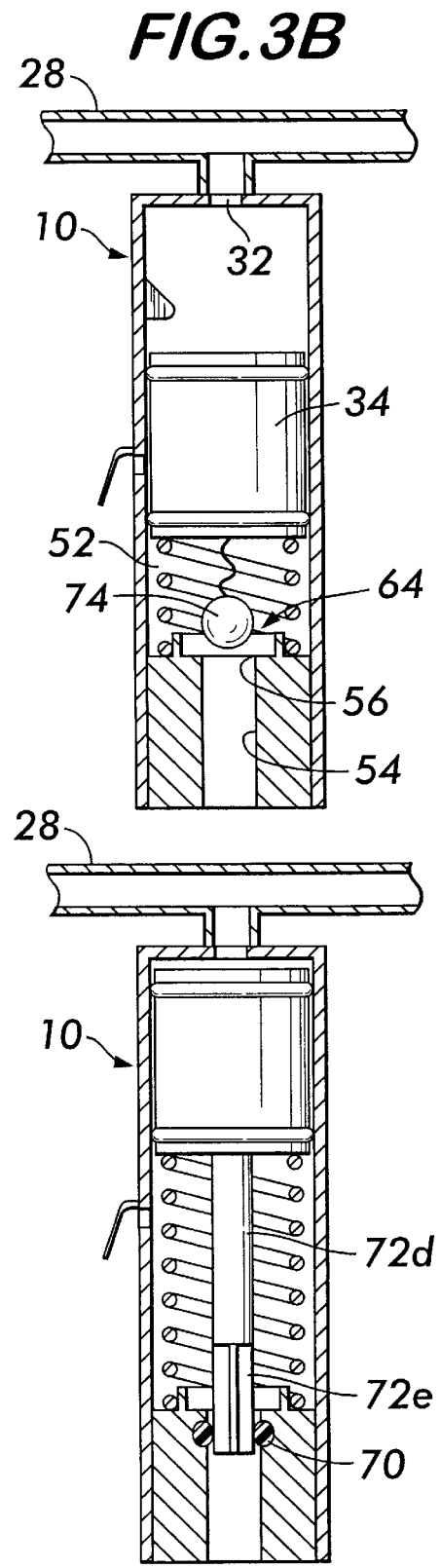

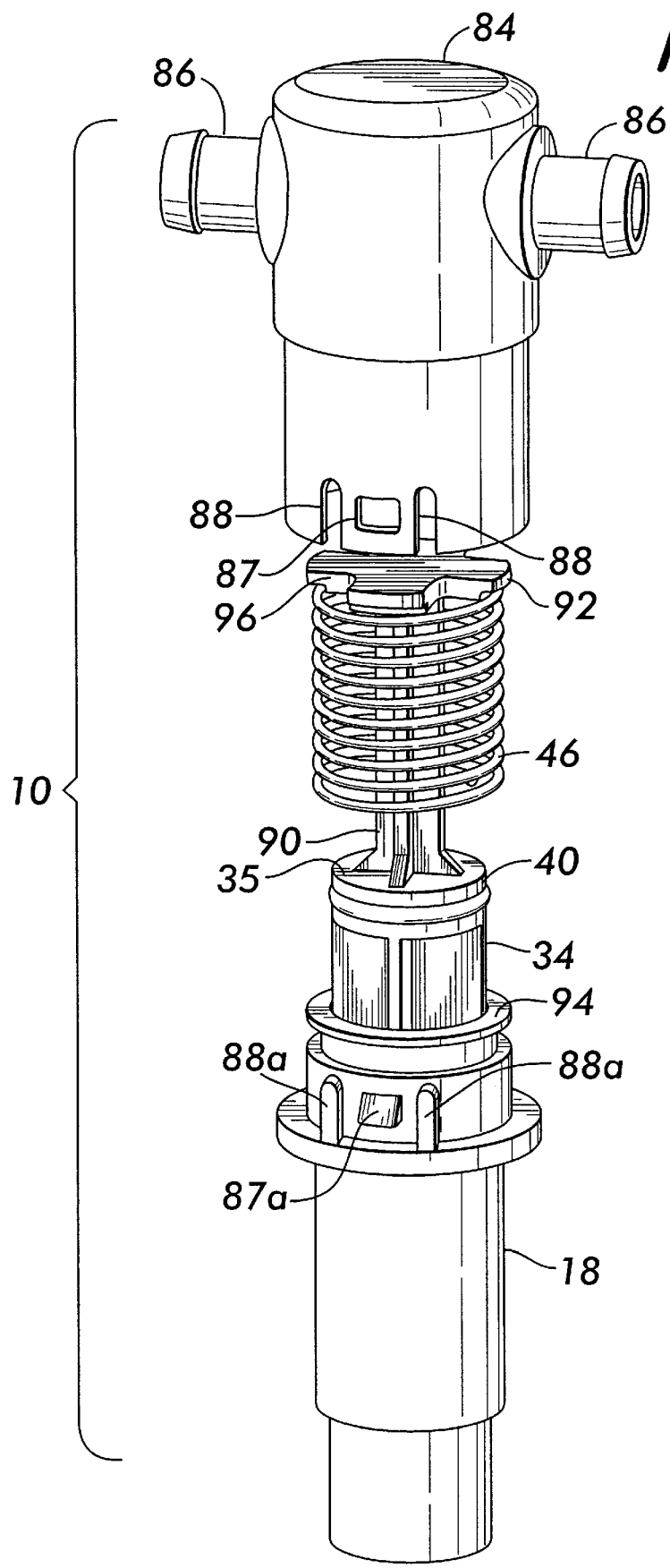

AUTOMATIC LIQUID FILLING DEVICE AND METHOD OF FILLING TO A PREDETERMINED LEVEL

This application claims the benefit to U.S. Provisional Application No. 60/108,970 filed Nov. 18, 1998 and which is hereby incorporated by reference.

FIELD OF THE INVENTION

The present invention relates to liquid filling devices, and more particularly to filling devices that automatically terminate the flow of liquid into a container when the liquid level in the container reaches a predetermined level. The present invention is ideally suited for watering industrial battery cells, although use of the invention for filling liquids in other applications is contemplated.

BACKGROUND OF THE INVENTION

Industrial batteries such as those used on fork lift trucks are generally of the flooded lead-acid type which require watering at regular intervals. An increasingly popular means of filling such battery cells with water is with a central watering system (single point watering system) whereby water is supplied through a tube to individual level-control devices in each battery cell. The flow of water to each cell is terminated when the electrolyte in each cell reaches the predetermined level.

A common type of level control device is the float valve as exemplified in U.S. Pat. No. 4,512,378 (Oschmann), U.S. Pat. No. 4,386,141 (Weidner), and U.S. Pat. No. 4,749,633 (Elias). Such float valves rely on the lifting force of a small float to operate the water shut-off valve. While most designs of this type have the float in the acid of the cell, one sub-type has the float in an external chamber as disclosed in U.S. Pat. No. 4,544,004 (Fitter).

The common float valve has fundamental and serious limitations. Due to the necessarily small size of the actuating float, the actuating force is very small, typically about 5 grams. They are therefore susceptible to sticking or jamming by relatively small forces that impede the floats motion, e.g., stickiness, friction, surface tension forces, etc. This leads to a lack of reliability in service.

Another type of level control valve operates on a fluidic operating principle as disclosed in U.S. Pat. No. 4,527,593 (Campau). This type of device uses small rubber-like diaphragms that tend to stick under adverse conditions which can also lead to unreliability.

Another type of valve which overcomes many of the problems of these other type valves operates on a hydrodynamic principle as disclosed in U.S. Pat. No. 4,556,093 (Jones). This type valve relies on the energy of an water stream to provide the shut-off force. Nevertheless, this valve has the limitation that it requires a high-flow water source to enable it to function properly.

Accordingly, one object of the present invention is to provide a means for filling liquid into containers to an accurate and predetermined level that overcomes many of the limitations of the prior art devices.

Another object is to provide a device that will permit both high and low speed filling rates.

A further object is to provide a system that is safer than conventional watering systems.

A still further object is to provide a filling device with low manufacturing costs.

Additional objects, advantages and novel features of the invention will be set forth in part in the description that follows, and in part will become apparent to those of ordinary skill in the art upon review of the following or may be learned by practice of the invention.

SUMMARY OF THE INVENTION

The present invention provides a device and method for filling a container with a supply liquid up to a predetermined level at which point the filling operation automatically stops. The invention uses the principle that gasses such as air are compressible whereas liquids such as water are not.

A device of the present invention has a cylinder which has an inner wall. A piston is moveable within the cylinder between a rest position and a fill position and has a first piston end and a second piston end spaced from the first piston end. The two piston ends are moveably sealable with the cylinder inner wall to prevent the flow of fluid past the seals while the piston moves. A biasing member, such as a spring, urges the piston towards the rest position. To allow the supply liquid to be introduced to the first piston end, an inlet is in fluid communication with the first piston end.

A fill port through the cylinder wall allows the supply liquid to exit the cylinder for filling said container. The fill port is positioned to be below the first end of said piston when the piston is in the rest position, and above the first end of the piston and in fluid communication with the inlet when the piston is in the fill position.

The second end of said piston sealingly moves in a sweep chamber between its rest and fill positions. A fluid port allows fluid from the container to enter the sweep chamber and has an internal end fluidly connected to the sweep chamber and an external end open to the outside of the device. The port also has an outer end positioned to be at the predetermined level when the device is installed in the container. A valve closes the fluid port in response to movement of the piston towards the fill position.

In another embodiment the fluid port and fill port are combined into at least one port.

For the method, the filling operation can begin by introducing the supply liquid under pressure to one end of a piston. The piston moves to a fill position thereby opening a fill port through which the supply liquid enters and fills the container. The pressure on the supply fluid is then reduced and the piston moves back to the rest position and closes the fill port. When the piston moves back to the rest position, fluid from the container is drawn. If the fluid drawn is substantially gas then the above steps are repeated and the filling operation continues. If the fluid drawn is substantially liquid, then supply liquid is again introduced under pressure to the one side of the piston to urge the piston downward. This time, however, the liquid drawn is trapped against a second end of the piston thereby stopping the piston from moving to the fill position.

DETAILED DESCRIPTION OF THE DRAWINGS

The invention will be described in detail below with reference to the following drawings:

FIG. 3A is a cross sectional view of another embodiment of the present invention of the "on-off" type having a ball valve;

FIG. 3B is a cross sectional view of another embodiment of the present invention of the "on-off" type having a tethered ball valve;

FIG. 3C is a cross sectional view of another embodiment of the present invention of the "on-off" type having a shaft valve;

FIG. 3D is a cross sectional view of another embodiment of the present invention of the "on-off" type having a shaft valve and fixed O-ring;

FIG. 5A is an exploded view of another embodiment for use with battery watering systems;

DETAILED DESCRIPTION

Figure 1A:
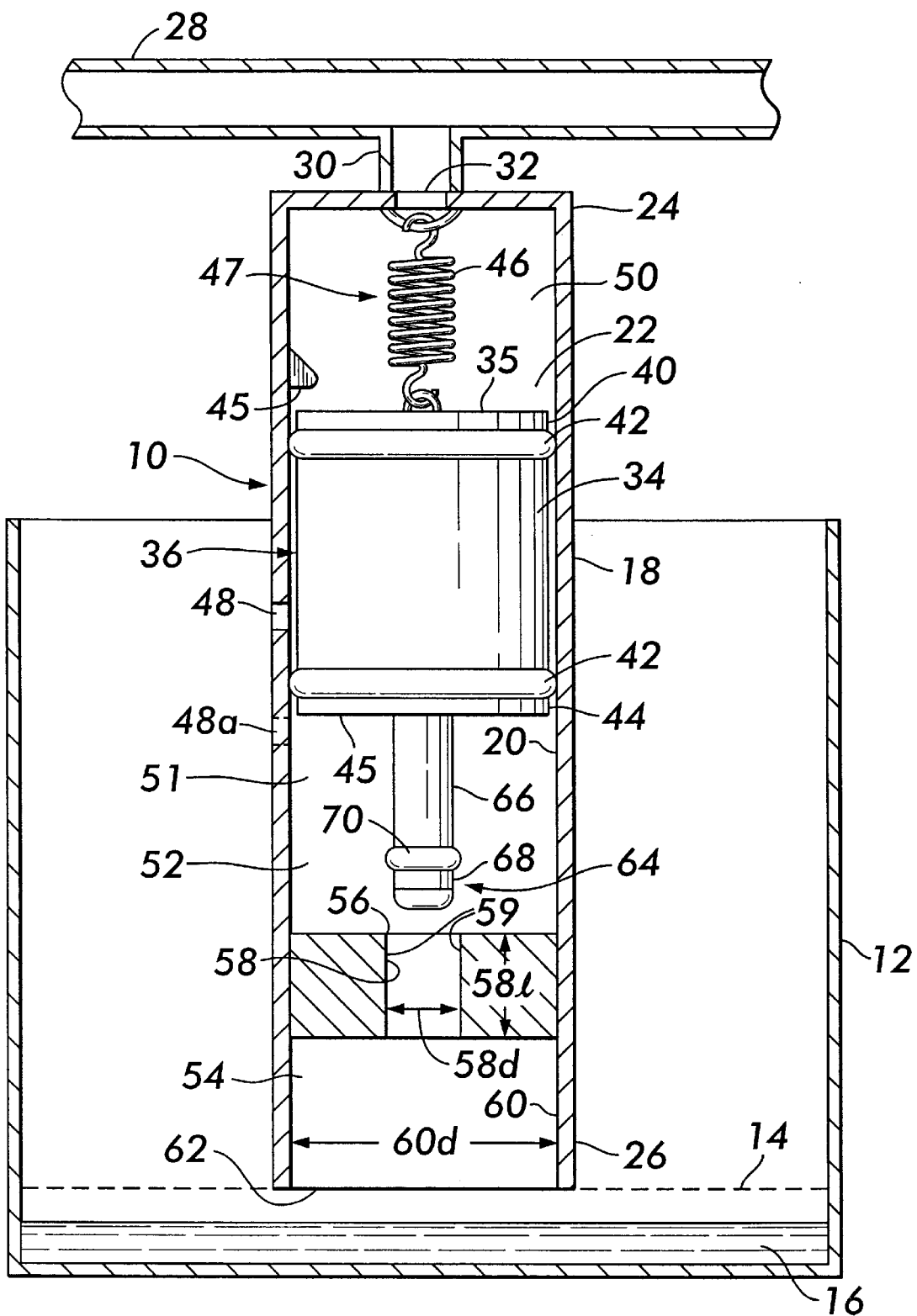
FIG. 1A is a cross sectional view of one embodiment of a device in accordance with the present invention showing the piston in the rest position.
Figure 1B:
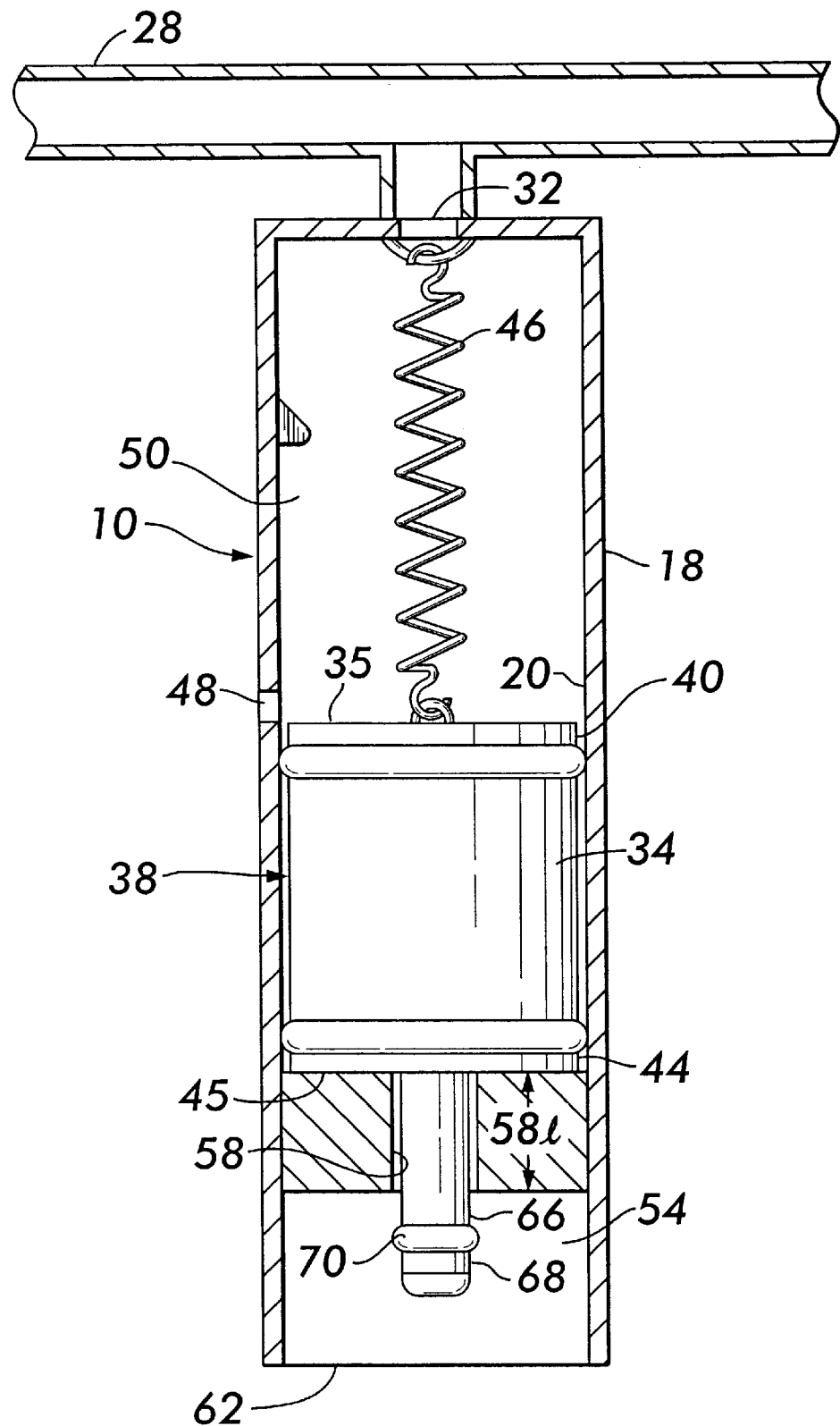
FIG. 1B is a cross sectional view of the device of FIG. 1 showing the piston in the fill position.
Figure 1C:
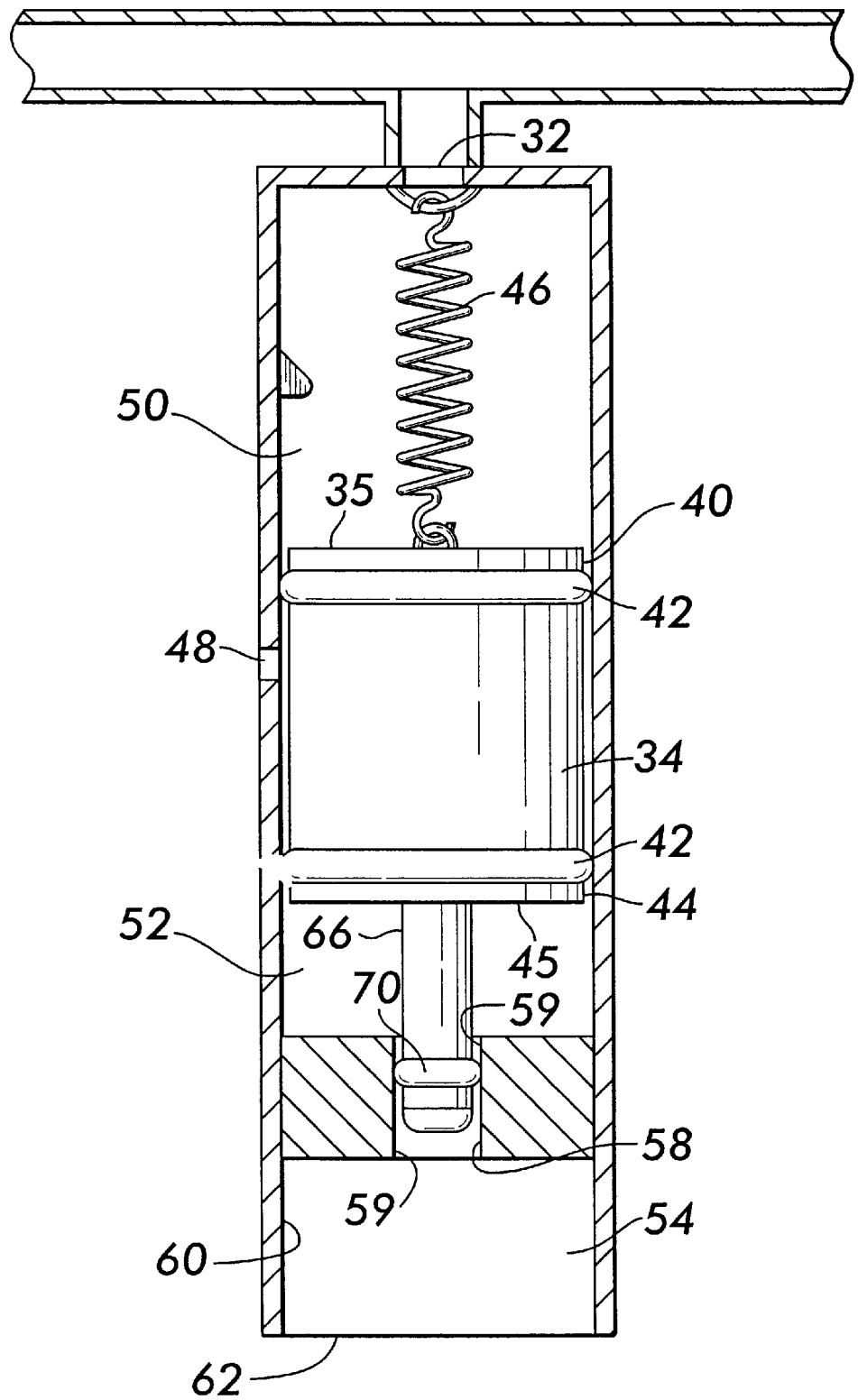
FIG. 1C is a cross sectional view of the device of FIG. 1 showing the piston in the intermediate—stop position.

Illustrated in FIGS. 1A, 1B and 1C is a device 10 for filling liquid into a container 12 up to a predetermined level 14 at which point the device 10 automatically stops the addition of liquid into the container 12. For example, the device 10 could be used for filling water (the supply liquid) into a battery cell (the container 12) containing an existing amount of liquid 16 (electrolyte).

The device 10 includes a vertical cylindrically shaped cylinder 18 having an inner wall 20 and defines an internal area 22. For reference purposes, the device 10 has an upper end 24 and a lower end 26, it being understood that device is not limited to the vertical position shown. An inlet 32 in the upper end of the device 10 allows supply liquid to enter the internal area 22 for filling the container 12 as described below. The supply liquid is provided to the inlet 32 through a tube 28 connected to a tee 30 as part of a water distribution system which may supply liquid to a plurality of devices 10 served by the tube 28.

Moveable within the cylinder 18 is a piston 34. The piston is moveable between a rest position 36 towards the upper end of the cylinder 18 (FIG. 1A) and a fill position 38 towards the lower section of the cylinder 18 (FIG. 1B). A first end 40 of the piston 34 has a face 35 and is moveably sealable with the cylinder wall 20 by means of a seal 42 (an O-ring being shown) so as to maintain the seal as the piston moves; likewise a second end 44 of the piston has a face 45 and is moveably sealable with the cylinder wall 20 by means of a seal 42 (O-ring). Any suitable seal may be used to maintain a seal with the cylinder wall 20 and prevent the passage of liquid while allowing the piston to move. A stop 45 defines the upward most position of the piston 34.

A biasing member 46 within the internal area 22 urges the piston 34 towards its rest position 36. The biasing member illustrated is a tension spring 47 attached at one end to the piston 34 and at the other end to the upper section of the device 10.

A fill port 48 is provided through the side of the cylinder 18 and is positioned to be below the first end 40 of the piston 34 (i.e. below the seal 42 for the first end 40) when the piston is in rest position 36 of FIG. 1A and above the first end 40 (i.e. above the seal 42 for the first end 40) when the piston 34 is in the fill position 38 of FIG. 1B. When the piston 34 is in the rest position as shown in FIG. 1A, supply liquid is introduced through the inlet 32 is blocked from the fill port 48 by the sealed first end 40 of the piston. When the piston 34 is in the fill position as shown in FIG. 1B, however, the liquid exhaust port 48 is in fluid communication with the liquid inlet 32 such that liquid entering the inlet 32 can flow through an upper internal section 50 and out the fill port 48 to fill the container 12. Thus, the piston 34 opens and closes the exhaust port 48 as it moves between its rest and fill positions.

Below the piston 34 is a lower internal section 51 (see FIG. 1A) defining a sweep chamber 52 in which the second end 44 of the piston sealingly moves and which changes in volume as the piston moves between its rest and fill positions. See FIGS. 1A, 1B and 1C. A fluid port 54 provides fluid communication between the sweep chamber 52 and the container 12 so that fluid can flow between them. The fluid port 54 has an internal end 56 opening into the sweep chamber 52, an upper narrow cylindrically shaped conduit 58 having an axial length 581, a wider conduit section 60, and an external end 62 opening to the outside of the device 10. As seen, the external end 62 is positioned to be at the predetermined liquid level 14 when the device 10 is installed in the container 12. The port 54 allows fluid, be it gas or liquid, to pass between the sweep chamber 52 and the container 12 for purposes further described below.

A valve 64 within the device 10 closes the fluid port 54 in response to movement of the piston 34 towards the fill position. In the present device, the valve 64 has a rod like shaft 66 extending from the piston 34 and which has a tip 68 having a circular seal member 70, an O-ring illustrated, which movingly seals within the port conduit 58 against the conduit wall 59 so as not to allow fluid to pass while the seal member 70 is within the conduit 58 (see FIG. 1C). It is further seen with reference to FIG. 1B that the axial length 581 of the conduit 58 is less than the stroke of the piston (the distance the piston moves between the rest and fill positions). Thus in the very beginning of the cycle of movement from the rest position to the fill position fluid may pass freely through the port 54 (FIG. 1A); the port is then sealed closed to prevent the free flow of fluid while the seal member 70 moves the axial length of the conduit (FIG. 1C); and then reopens to again allow free flow of fluid between the sweep chamber 52 and the container 12 once the seal 70 moves past the conduit 58 (FIG. 1B).

It is seen that the volume of the sweep chamber 52 decreases as the piston 34 moves downward towards the fill position. The diameter 58d of the port conduit 58 is smaller than the diameter 60d of the lower section 60 of the port. Thus as the piston moves downward the volume added to the sweep chamber 52 in the port conduit 58 above the seal 70 (see FIG. 1C) is more than offset by the volume lost in the cylinder directly below the piston.

The operation of the device is now described with reference to FIGS. 1A, 1B and 1C. The present device uses the well known principle that gases such as air are compressible whereas liquids such as water are not. For example, the piston 34 can move inside an enclosed air filled sweep chamber 52 by compressing the air within but it can not move inside an enclosed water filled sweep chamber 52 because the water is essentially incompressible. Additionally, unlike other filling devices and systems which are supplied with liquid at a constant pressure, the present invention is supplied with liquid at an alternating pressure by means further described below. The water pressure is deliberately cycled between a high pressure and a lower pressure, for example, an ON phase of 15 psi and an OFF phase of 0 psi. This cycles the piston 34 in a reciprocating manner between its fill and rest operating positions and allows the device to generate high hydrostatic forces during the ON phase to overcome any possible stickiness or friction and thereby a very high degree of reliability.

Initially, the level of liquid 16 in the container 12 is below the external port end 62, the container 12 being empty or having a low liquid level, and it is desired to fill the container with liquid. The piston 34 is in its rest position as shown if FIG. 1A.

The filling process can begin with the introduction of supply liquid under pressure through the tube 28, tee 30, and inlet 32 into the upper internal section 50 of the cylinder to the first end 40 of the piston. The pressurized water acts on the first piston end 40 and urges the piston 34 downward towards the filling position 38 shown in FIG. 1B. As the piston 34 moves downward in response to the pressure, air (gas) is initially exhausted from the sweep chamber 52 through the opened port 54. When the piston 34 moves far enough such that the port 54 is closed by the valve seal 70 as shown in FIG. 1C, an intermediate position between the rest and fill positions, the air becomes trapped within the sweep chamber 52 below the second piston end 44. Since the trapped air is compressible, the movement of the piston 34 is not significantly impeded as the pressure of the liquid supplied through the inlet 32 provides sufficient force on the piston to overcome the force from the compressed gas and the piston continues to move downward to its fill position as shown in FIG. 1B. It is seen that the port reopens as the piston 34 approaches the fill position forcing out a substantial amount of the gas in the sweep chamber 52.

It is further seen that as the piston reaches the fill position of FIG. 1B, the sealed first end 40 of the piston uncovers the exhaust port 48 allowing the liquid flowing into the cylinder 18 through the inlet 32 to flow out the exhaust port 48 into the container 12. The flowing of liquid into the container continues as long as the water pressure is maintained.

The supply pressure of the liquid is then reduced, here to 0 psi. The spring 47 moves the piston back to its upper rest position of FIG. 1A, drawing behind it into the sweep chamber 52 fluid from the container 12. At the end of this cycle the original starting conditions have been restored except that some liquid has been added to the container. The amount of liquid added will be a function of factors such as the water pressure, the exhaust port size, and the time of the cycle.

The above cycle is repeated with the pressure alternating between ON (high pressure) and OFF (reduced pressure) until the liquid level in the container 12 rises to the bottom 62 of the port 54 at which point the conditions change significantly. During the next return stroke, when the piston rises under the action of the spring, it draws behind it not air which is compressible, but liquid 16 from the container 12 which is incompressible. The liquid fills a substantial part of the sweep chamber 52 and remains there when the piston 34 reaches its rest position.

On the next cycle as pressurized supply liquid is again introduced to the upper side of the piston 34, the piston again begins to move downward until the port 54 is closed by the valve seal 70 to trap the liquid within the sweep chamber 52. Now, the piston 34 quickly comes to a halt in the intermediate position as shown in FIG. 1C. The liquid, being incompressible, applies a hydrostatic force on the second piston end 44 to balance the force on the first piston end 40 from the supply liquid and thus prevents movement. Since the fill port 48 is not open when the piston is in the intermediate position of FIG. 1C, no additional supply liquid can enter the container 12. The filling action is thus stopped even if the cycling of the pressure of the water supply to the device 10 continues. In a system of multiple devices 10 supplied by a common liquid supply line 28, the cycling can continue as needed until all containers are filled with only those containers in need of liquid being filled.

A main advantage of the invention is its reliability.

Its simplicity of one moving part means there is less risk of failure. The invention also has relatively large forces available for operating the device. For example, whereas a float valve in a battery cell may have an operating force due to the buoyancy of the float of only 5 grams, the present invention can have a practical operating force of 2,500 grams at 30 psi—five hundred times more force. In fact, even greater force could be applied if desired but does not seem to be necessary. The problem of sticking valves is virtually eliminated with these available forces.

The device 10 is also rugged and not prone to the problems of other filling devices as described in the background section above. There are no delicate floats to break or fall off when the device is removed from the container for inspection. The working elements are enclosed within the device 10 and thus the device is not fragile.

The present invention has another advantage in that it has wide utility with liquids other than low viscosity liquids such as water. Due to its hydrostatic principle of operation, it will also work with highly viscous fluids such as oil. Many of the other devices described above will not work well with high viscosity fluids.

A variation of the device 10 of FIG. 1 is now described with reference to FIG. 2 which is similar in design to that shown in FIG. 1A. Here a compression spring 47a forms the biasing member 46. Compression springs are believed to be cheaper and easier to assemble in the device as compared to the tension spring 47 of FIG. 1A. Typical spring materials for tension or compression springs include stainless steel and other materials suitable for the particular application. However, in the design of FIG. 2 where it is positioned beneath the piston 34, the spring 47a is exposed to the liquid 16 drawn into the sweep chamber 52 from the container 12. In uses such as battery filling where the liquid to be drawn is a sulfuric acid electrolyte, a higher cost spring material that will not corrode may be necessary. On the contrary, the tension spring of FIG. 1A, is exposed mainly to the supply liquid which, in battery service, is water.

A deflector 78 is shown to deflect downward the liquid exiting the fill port 48.

Figure 2:
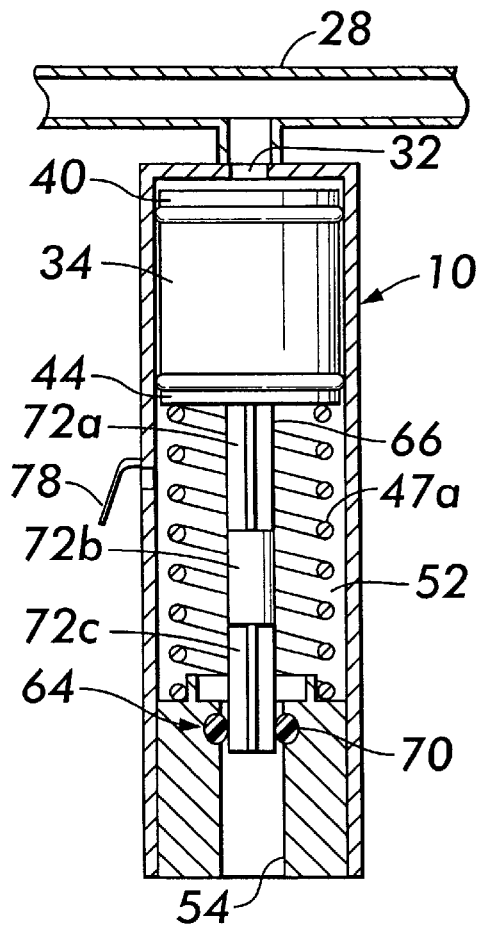
FIG. 2 is cross sectional view of another embodiment of a device in accordance with the present invention.

Another difference between the device 10 of FIG. 2 and that of FIG. 1A is the design of the valve 64. In FIG. 2 the valve seal member 70 (O-ring illustrated) is fixed within the port 54 instead of being attached to and moving with the shaft 66. The shaft 66 is connected to the bottom of the piston 34 for movement therewith, and has an upper section 72a shaped so as not to seal against the seal member 70, a middle section 72b shaped to seal against the seal member 70, and a lower section 72c shaped not to seal. Thus, as with the device 10 of FIG. 1A, the device 10 of FIG. 2 operates such that the port 54 is sequentially open, closed, and then open again as the piston 34 moves downward from the upper—rest position, through the intermediate position, and finally to the fill position. These type valves are designated "open-close-open" designs. FIGS. 3A to 3D illustrate even simpler versions of the present invention and are of an "open-close" type design. The devices 10 of FIGS. 3A and 3B respectively include a valve 64 formed as a ball 74. The device 10 of FIG. 3A has an untethered ball 74 that moves up and down in response to the movement of the fluid through the port 54 as the piston moves. Once the ball seats against the internal end 56 of the port 54 upon downward movement of the piston, the fluid within the sweep chamber 52 is trapped and if incompressible, will stop the downward movement of the piston. Upward movement of the piston 34 upon release of the pressure on the supply liquid removes the pressure acting on the upper side of the ball 74 and draws in fluid from the container which unseats the ball from the port 54. The tethered ball 74 of FIG. 3B insures unseating by pulling the ball from the port 54 upon upward movement of the piston. A stop 76 controls the upward movement of the piston and thus the amount of fluid drawn into the sweep chamber 52.

The device 10 of FIG. 3C is similar in design to that of FIG. 1A except that the port 54 is of uniform diameter to maintain the seal between it and the valve seal member 70 so that the port 54 remains closed as the piston continues to move downward towards the fill position. The device 10 of FIG. 3D is similar in design to that of FIG. 2 except that the shaft 66 has only an upper section 72d shaped to seal against the seal member 70 when the piston 34 is in the lower position, and a lower section 72e shaped not to seal when the piston is in the upper positions. All designs of FIGS. 3A to 3D are of the "open-close" type, i.e., once the port 54 is closed to trap the fluid within the sweep chamber 52, the port 54 remains closed throughout the remaining downstroke of the piston and does not reopen as the piston approaches the downward fill position as does the "open-close-open" designs.

The "open-close-open" designs are believed to be have particular advantages. With reference to FIGS. 1A, 1B and 1C, after the container 12 has been filled and the filling process stopped, liquid may be retained within the sweep chamber 52 as the liquid level in the container 12 drops below the predetermined level 14 even though the port 54 is open. When the device 10 is again operated to again fill the container 12, the initial downward movement of the piston 34 prior to the closure of the port 54 removes some of the liquid from the sweep chamber 52 before the port 54 is closed. If enough liquid remains in the sweep chamber 52, however, the downward movement of the piston is stopped short of uncovering the fill port 48 for filling of the container. When the pressure of the supply liquid is reduced, the piston returns to its rest position drawing in compressible gas (air) from the container since the liquid level in the container is still below the predetermined level. Additional liquid is cleared from the sweep chamber 52 with each additional on-off cycle allowing the piston 34 to move lower and lower until enough liquid has been cleared to allow full operation and filling of the container 12.

It is believed that the "open-close-open" devices clear the liquid retained in the sweep chamber 52 in less cycles. The remaining retained liquid is readily cleared once the piston moves sufficiently downward to reopen the port 54 as seen in FIG. 1B. With no liquid left to stop it, the piston 34 moves to its fill position and forces out the pot of the remaining liquid. Since the port 54 does not reopen in the "open-close" devices during the downstroke of the piston 34, additional cycles are needed to clear the sweep chamber.

It is seen that some amount of compressible gas is retained in sweep chamber 52 when the piston is in the rest position even when a sufficient amount of liquid has been drawn in to stop the piston. The gas allows some movement of the piston in the next filling operation to begin clearing the retained liquid from the sweep chamber 52.

Another advantage of the open-closed-open design is better control over the operating parameters such as the liquid supply pressure. When the sweep chamber 52 contains gas, the pressure of the supply liquid entering inlet 32 must be sufficient to force the piston 34 downward against the force exerted on the piston by the compressing gas in the sweep chamber once the port 54 is closed. In the "open-close" designs the force exerted on the piston continues to increase throughout the entire downstroke of the piston, while in the "open-close-open" designs the compression of the gas ceases once the port 54 reopens. Thus a lower supply pressure may be sufficient for the open-close-open designs.

With reference to FIG. 1A, quicker drainage of the liquid retained in the sweep chamber at the end of a filling operation may be attained by placing the fill port 48 below the piston's second end 44 when the piston is in the rest position (see exhaust port 48a shown in dotted line in FIG. 1A). This way air can enter the sweep chamber 52 to aid drainage when the device is in the rest position. Of course other parameters of the design may need to be altered such as the size of the sweep chamber, the length of the stroke of the piston and the seal configurations so that it uncovers the exhaust port 48a in the fill position. Another variation would be to keep the exhaust port 48 in its original position as shown in FIG. 1A and add a second small drainage hole 48b (in the same place as 48a shown in dotted line).

Figure 4:
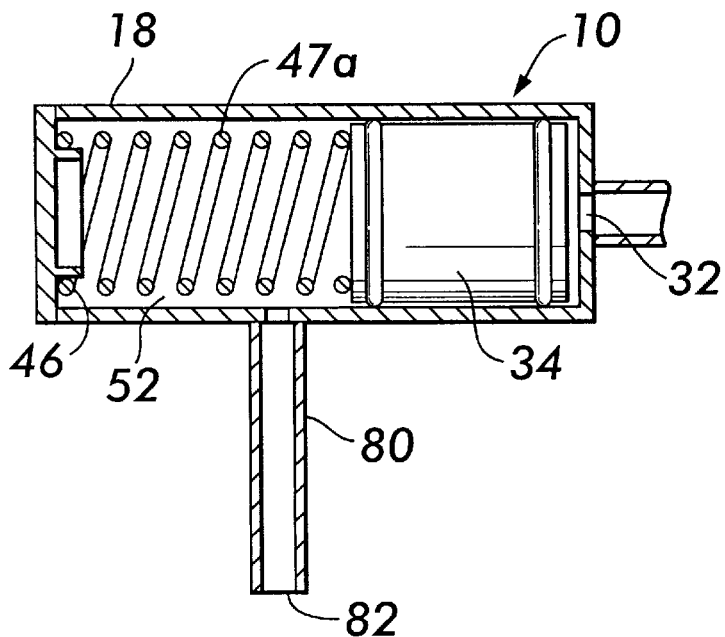
FIG. 4 is a cross sectional view of yet another embodiment having a single port for both filling and drawing in fluid from the container and which is illustrated for horizontal use.

A more simplified embodiment suited for non vertical use is now described with reference to FIG. 4. Moveable within the cylinder 18 is the piston 34 between the rest position (as shown in FIG. 4) and the fill position (not shown) where the piston 34 has moved to the left to uncover a port 80. The piston 34 is similar to that of FIG. 1A. For reference purposes in relation to the previous embodiments, the right end of the device is equivalent to the upper end 24 of the device in FIG. 1A.

A biasing member 46 (compression spring 47a) biases the piston 34 towards the rest position.

When the sweep chamber 52 contains mostly compressible gas, the pressurized supply liquid introduced through inlet 32 pushes the piston 34 to the left towards the fill position, compressing the gas in the sweep chamber 52 once the piston covers the port 80 to trap the gas. The port 80 is reopened once the piston moves sufficiently to the left to allow supply liquid from the inlet 32 to exit the port 80 into the container. The pressure of the supply liquid is then reduce to allow the piston to return to its rest position and the cycle repeats. This cycle continues until the liquid in the container reaches the bottom 82 of the port 80. On the next cycle, the piston 34 draws liquid from the container into the sweep chamber 52. Now when the piston 34 tries to move left towards the fill position, and after moving a sufficient distance to cover the port 80 and trap the liquid therein, the piston is prevented from traveling the remaining distance to the left necessary to reopen the port 80. The supply liquid entering inlet 32 cannot flow to the port 80 and thus the filling process is terminated.

To empty the sweep chamber 52 and begin a new filling operation after the liquid level in the container drops below the port end 82, several cycles of alternating pressure for the supply liquid are required.

This design has the benefits of very low cost, can be mounted external to the container, and has a very small port tube 80 into the container. The single port 80 provides the function of both the exhaust port 48 and the fluid port 54 as disclosed in the previous embodiments. Furthermore, the piston 34 also acts as the valve 64 closing the port 80 for compressing the fluid in the sweep chamber 52. This design is of the "open-close" type as discussed above.

A preferred embodiment for watering industrial battery cells is now described with reference to FIGS. 5A, 5B, 5C, and 5D. This device 10 is of the open-close-open type and is similar in design to the device of FIG. 1A. It is designed for insertion into a battery through a well by use of a well adapter. The device 10 has an upper housing 84 having barb fittings 86 for receiving flexible liquid supply tubes. One of the two barb fittings connects to the liquid supply inlet 32 while the other barb can be fluidly connected to other devices 10 to supply them with liquid as well.

The housing '84 snap fits onto a cylindrically shaped cylinder 18 to form the internal area 22, the housing having a snap opening 87 for receiving a cylinder snap protrusion 87a, and is properly aligned by registration slots 88 which receive cylinder slot protrusions 88a. An O-ring seal 89 insures a water tight connection between the two.

Figure 5B:
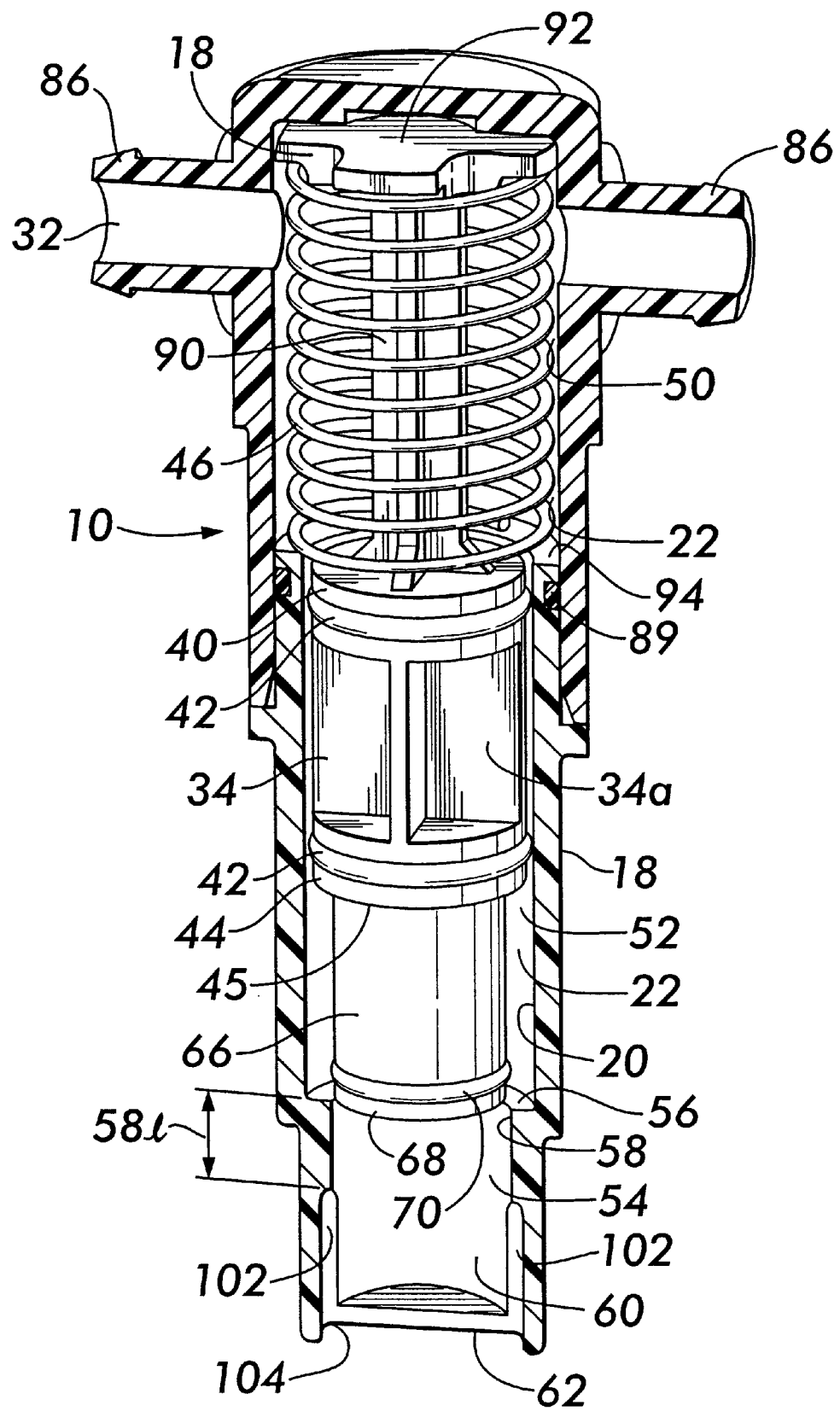
FIG. 5B is a cross sectional view of the device of FIG. 5A shown in the rest position.
Figure 5C:
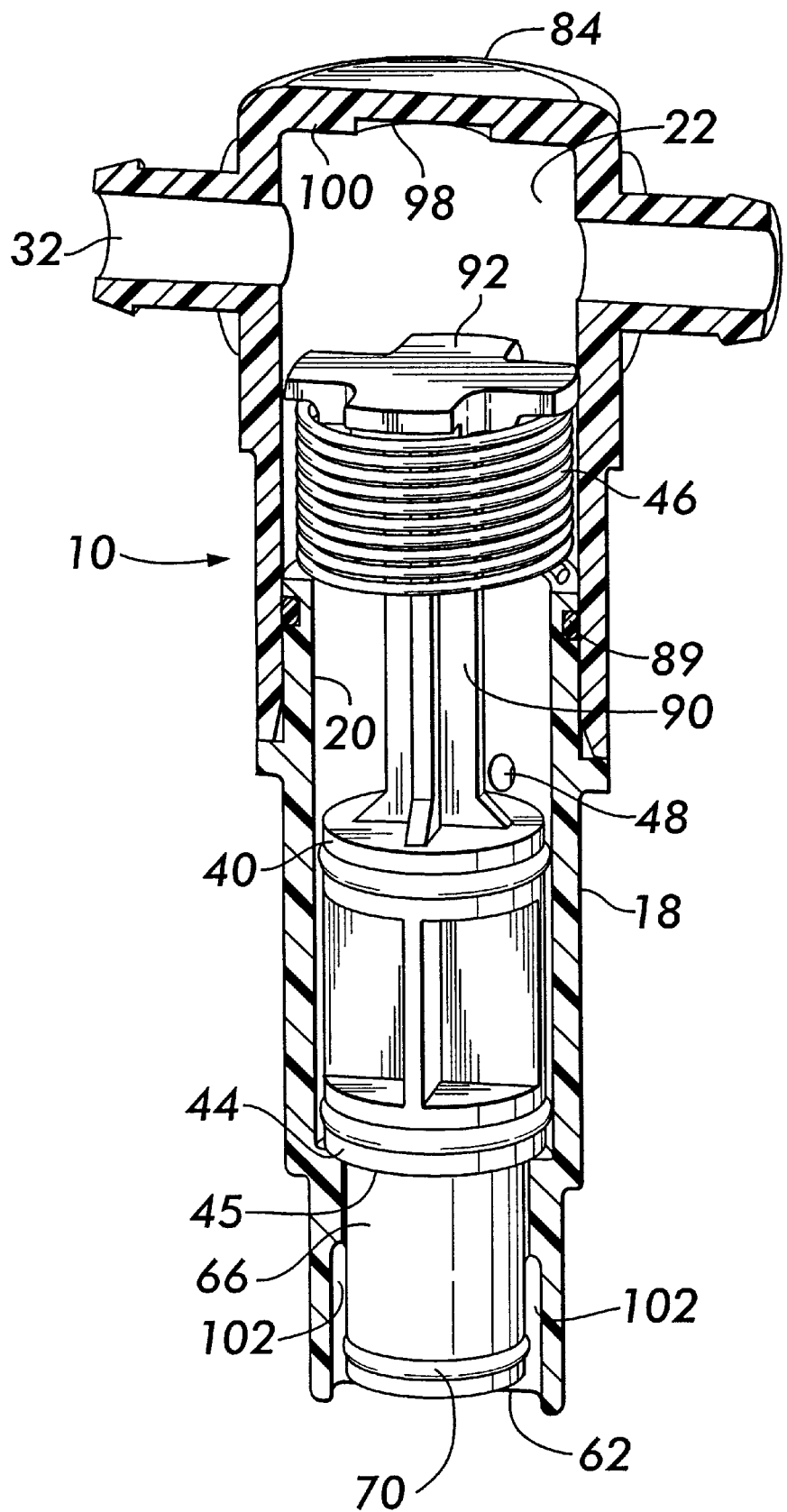
FIG. 5C is a cross sectional view of the device of FIG. 5A shown in the fill position.
Figure 5D:
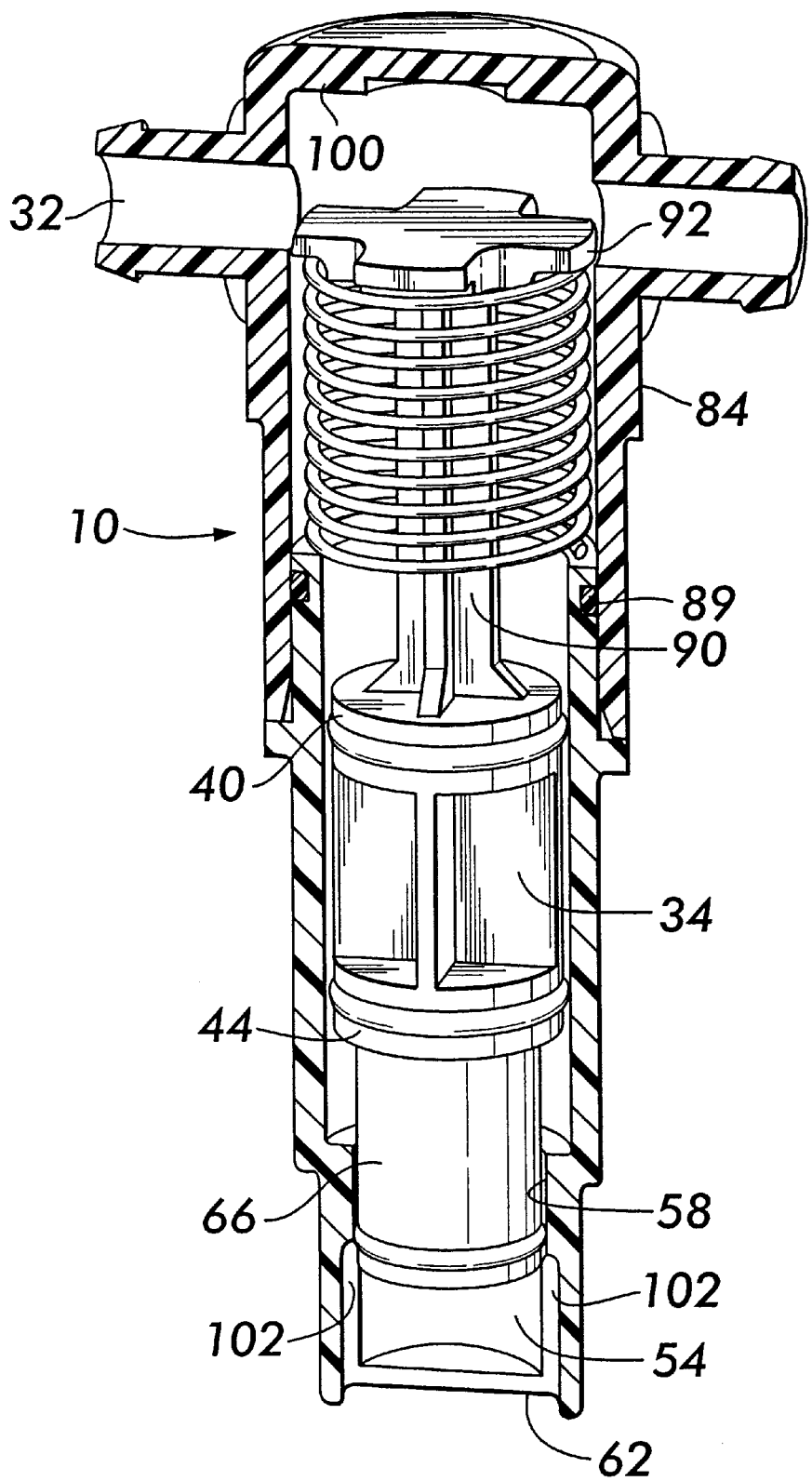
FIG. 5D is a cross sectional view of the device of FIG. 5A shown in the intermediate—stop position.

The piston 34 is moveable within the cylinder 18 between the rest position (FIG. 5B) and the fill position (FIG. 5C). An intermediate position between the rest and fill positions is shown in FIG. 5D. The first end 40 of the piston has a face 35 and is moveably sealed to the cylinder inner wall 20 by the seal 42 in the form of a U-cup seal oriented to prevent liquid in the upper chamber 50 from passing downward past the seal; likewise the second end of the piston 44 has a face 45 and is moveably sealed to the inner wall 20 by a seal 42 in the form of a U-cup seal oriented to prevent fluid from sweep chamber 52 below the piston 34 from passing upward past the seal. The piston section 34a between the two piston ends 40, 44 is shaped to minimize material use.

Here, the biasing member 46 is formed as a compression spring located above the piston 34. The piston has an integral upper extension 90 having a head 92 shaped to engage the top of the spring. The bottom of the spring 46 sits on a shoulder 94 formed on the cylinder 18. Thus the spring acts on the head 92 to urge the piston 34 upwards towards the upward/rest position. The spring is made preferably of stainless steel and sized to provide sufficient force to move the piston.

The head 92 has cut outs 96 to allow the water from the inlet 32 to flow past the head. The top 98 of the inside of the housing 84 has tabs 100 to prevent the head 92 from flushly abutting the top 98 and thereby prevent the pressurized supply liquid from urging the head 92 against the top 98 (FIG. 5C). The tabs 100 also act as a stop for the head 92 to define the upward most position of the piston.

The liquid fill port 48 as seen in FIG. 5C is positioned above the first end 40 of the piston when in the fill position. Pressurized supply water from inlet 32 can flow past the head 96, through the upper part of the device 10 and out the fill port 48 into the battery cell.

The fluid port 54, formed as a integral part of the cylinder 18, fluidly connects the sweep chamber 52 with the inside of the battery cell. Here, the port 54 has an upper internal end 56, a conduit 58 of uniform diameter and axial length 581, and a lower extension conduit 60 having grooves 102. The bottom external end 62 of the port defines the predetermined level 14 in the cell which, when reached by the electrolyte, the device 10 stops filling. The bottom end 62 has slots 104 which act as a filter to keep out debris from the electrolyte 16 which may interfere with the operation of the device.

The valve 64 for closing the port 54 has a rod like shaft 66 integral with and extending from the piston 34 and a seal member 70 on the tip 68 of the shaft for sealing the port 54 as it moves along the port conduit 58. Here, a U-cup type seal 70 is used oriented to prevent the fluid trapped above the seal 70 from passing downward and out of the device 10. As the stroke of the piston 34 is longer than the axial length 581 of the port conduit 58, the port 54 is initially open when the piston begins to move downward from the rest position of FIG. 5B, is closed when the seal 70 reaches the port conduit 58 as seen in FIG. 5D, and reopens once the seal 70 reaches the grooves 102 to allow fluid to flow past as seen in FIG. 5C, i.e. an "open-close-open" type design.

The diameter of the rod like shaft 66 of this embodiment is greater than that shown in the device of FIG. 1A. This lowers the surface area of the face 45 of the piston's second end 44 exposed to the pressure of the compressed gas in the sweep chamber 52 and thus lowers the force exerted by the gas on the piston. This in turn lowers the water supply pressure needed to operate the device. This also helps minimize the spring force needed to move the piston back to the rest position as the vacuum forces created on the lower piston end 44 are likewise reduced.

Preferred materials for the housing, cylinder and piston structures of the embodiment of FIG. 5 include polypropylene and poly phenoline oxide for acid resistance and thermal stability. The preferred seal materials include viton and other suitable materials.

One set of preferred dimensions for the device of FIG. 5B include the piston 34 having a diameter of about 0.496 inches and a length of about 0.72 inches from face 35 to face 45 (0.57 inches between the centers of the two seals 42), the shaft 66 having a length of about 0.495 inches and diameter of 0.371 inches, and the extension 90 having a length of about 0.99 inches from the piston face 35 to the top of the head 92. The cylinder 18 has an internal diameter of about 0.5 inches for receiving the piston 34 and a length from the top of the cylinder 18 to the internal end 56 of the port 54 of about 1.25 inches, and a fill port 48 having a diameter in the range of 1/32 to 1/8 of an inch with 1/16 of an inch more preferred. The port 54 has an internal diameter of about 0.375 inches, a length from the bottom of the cylinder 18 to the external port end 62(not including the thickness of the wall defining the port end 62) of about 0.5 inches, and a port conduit length 581 of about 0.2 inches.

The supply liquid for the present invention is provided with alternating or variable pressure. The pressures are relative and may be any sensible pressures whereby one pressure is higher than the other. Preferred pressures for most battery filling applications is a high pressure between 15 and 30 psi with about 20 psi being more preferred, and a low pressure of about 0 psi. Other applications may require different pressure ranges. In another variation, the low pressure would be a negative pressure or vacuum capable of moving the piston back to the rest position. This would eliminate the need for a biasing member 46 but may require additional equipment to generate the vacuum.

Preferred cycle times for most battery filling applications is between 5 and 10 seconds per each cycle, i.e. introducing pressurized supply liquid into the device for the desired time period and then cutting off the pressure of the supply liquid.

Figure 6A:
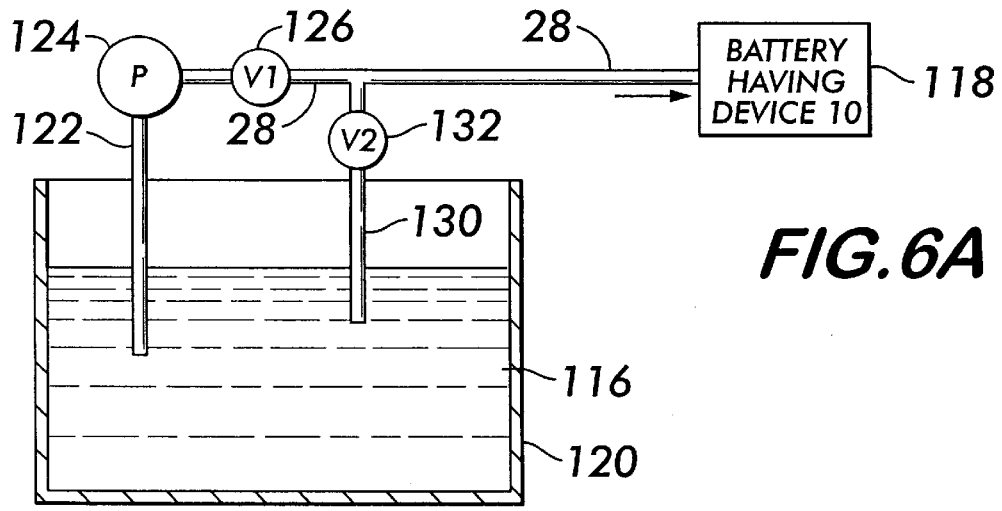
FIG. 6A is a schematic view of a water supply system.

With reference to FIG. 6A, a preferred liquid supply providing a high pressure and a low pressure of 0 psi for adding water 116 to a battery 118 is now described. A tank 120 or some other type container of water provides the water through a conduit 122 to a pump 124 which supplies the water at a relatively constant pressure. A first solenoid valve 126 is in the water supply line 28 between the pump 124 and the device 10 in the battery. A drain line 130 with a second solenoid valve 132 is placed between the first solenoid valve 126 and the device 10 mounted at the battery, the drain line 130 shown returning the water to the tank 120.

The two solenoid valves 126, 132 are controlled by a controller to cycle between high and low pressure states while the pump runs continuously, i.e., in the high pressure state the first solenoid valve 126 is open to allow the flow of pressurized supply water 116 to the device 10 while the second solenoid valve 132 is closed. In the low pressure state the first solenoid valve 126 is closed to cut off the supply of high pressure water to the device 10 and the second solenoid valve 132 is open to release the pressure in the line 28 and allow any excess water to drain.

The controller of the solenoids 126,132 may be as simple as a cam operated On/Off switch or be a more advanced programable electronic controller which may include advanced features such as measurement of the amount of water delivered to each battery cell.

Figure 6B:
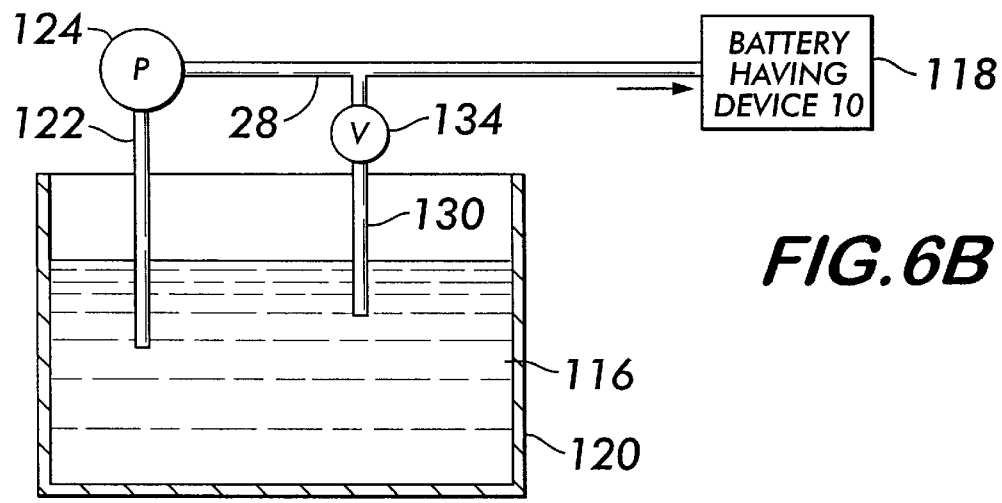
FIG. 6B is a schematic view of a second embodiment of a water supply system.

A variation in the supply system of FIG. 6A is shown in FIG. 6B. Here a single solenoid valve 134 is provided in the drain line 130, the solenoid 134 being cycled between open and closed states. When the solenoid 134 is closed, the pressurized water flows to the batteries through the supply tubing 28; when open, however, the pressurized water supply is short circuited down the drain line 130.

Figure 6C:
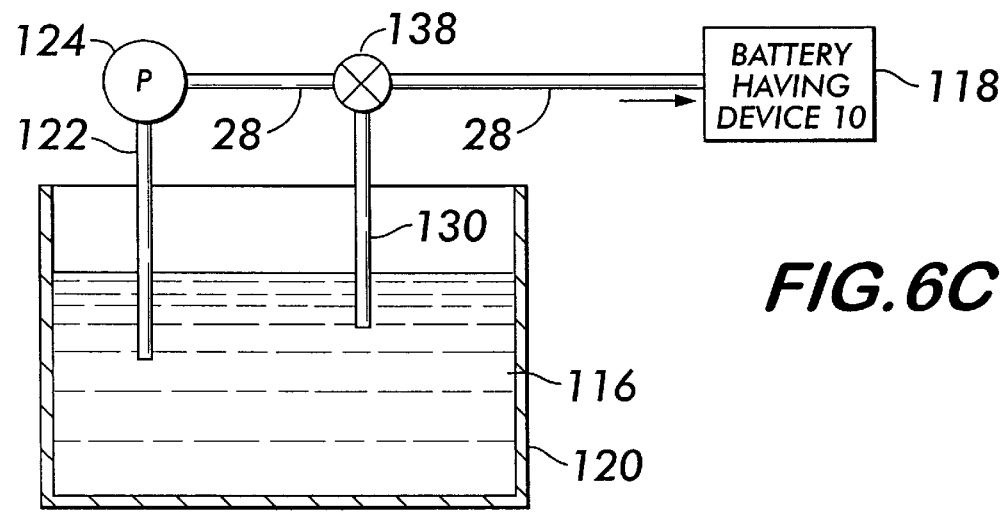
FIG. 6C is a schematic view of a third embodiment of a water supply system.

Another variation is shown in FIG. 6C having a single three-way solenoid valve 136. In a first position of each cycle the solenoid valve 136 is open to the tubing 28 feeding the batteries and closed to the drain line 130; in the second position the solenoid valve 136 is closed to the tubing 28 feeding the batteries and open to the drain line 130. These water systems can supply one or several hundred devices 10. Other variations include mechanical and hand operated valves.

The water supply system of the present invention can be coupled with battery charging systems for automatic filling, the charger turning on the water supply system when the battery cells reach "gassing voltage" which is when the electrolyte is at its highest level. Alternatively, the system can be manually turned on and off or turned on with a timer which turns the system off after a preset amount of time.

Figure 7:
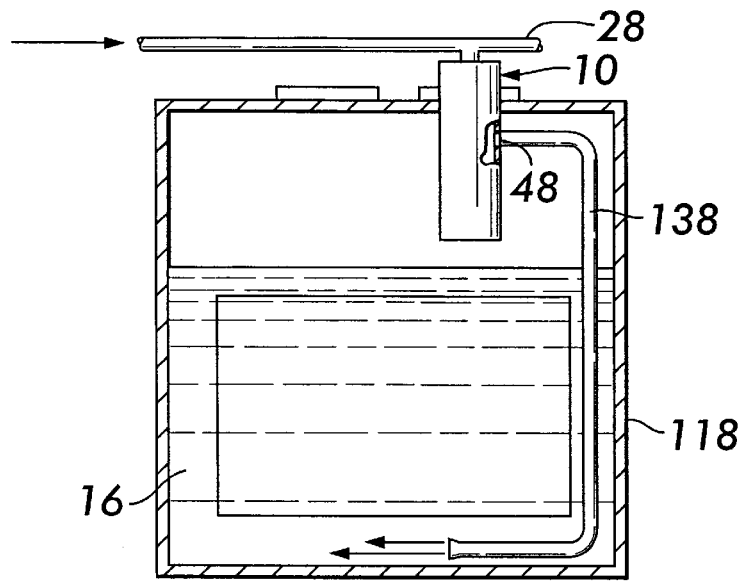
FIG. 7 is a schematic view of a device similar to that of FIG. 1 having the fill port piped to the bottom of a battery cell.

The device and method described above for filling liquid has unique advantages and flexibility over other types of devices. In particular, the invention has unique advantages for battery filling. With reference to FIG. 7, a feature not available with traditional battery watering systems is the capability of piping the water from the fill port 48 of the device 10 to the bottom of a lead-acid battery cell 118 in order to mix the water with the electrolyte 16. This may be particularly valuable in certain tall stationary and submarine batteries. In conventional watering systems, water is added on top of the electrolyte 16 and, due to its lower density, can float for a considerable period of time before dissipating by diffusion. This capability of being able to discharge water against the positive pressure or head is not possible with other known single point watering systems. A simple tube or conduit 138 can be attached to the fill port 48 for directing the water to the bottom of the cell as shown.

Figure 8:
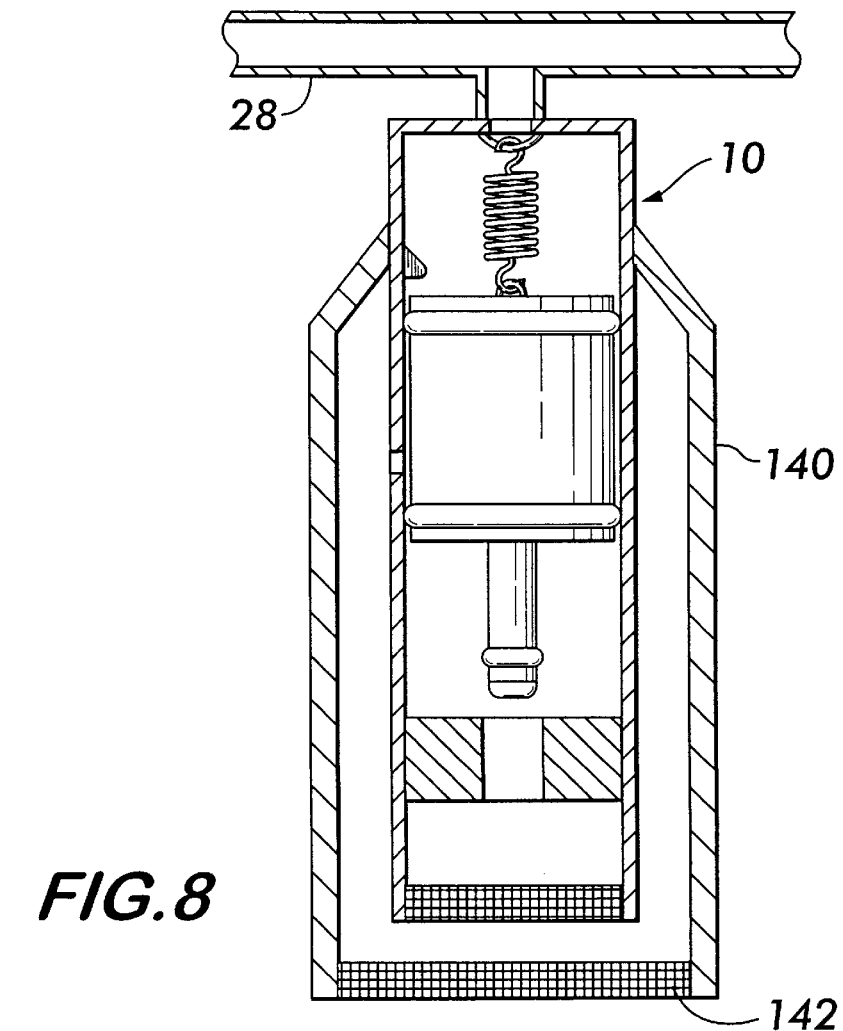
FIG. 8 is a schematic view showing the supply liquid directed to clean filters.

Illustrated in FIG. 8 is another alternative where the an outer wall 140 directs the supply liquid exhausted from the fill port 48 to a filtered opening 142. This way the clean water from the fill port 48 keeps the filtered opening 142 clean. This may have application in extremely dirty applications.

Another advantage of the present invention is that it may be used with battery cells that are slightly pressurized. For example, the device 10 can be used in conjunction with nickel/cadmium cells having Edison-style pressure relief valves designed to prevent of carbon dioxide from the air from entering the cell by having a small but significant relief pressure requirement. Another example is the case of cells having very fine (demister) vents to filter the electrolyte aerosols that tend to cover the outside of the battery and cause corrosion. These demisters may have very fine pores which can also cause a small back pressure in the cells during charging.

For most traditional watering systems, cell pressurization will cause a problem because the oxygen-hydrogen gases will be forced up the watering tube and may establish a flame path for explosions. The device 10, by contrast, provides a pressure tight seal between the cell 118 and the water tubing 28 so the problem does not exist; the cell can be pressurized without this risk.

This invention also has the advantage of improved safety because there is no hydrogen connection between battery cells 118 via the tubing 28 connecting multiple cells; that is, there cannot be a chain reaction to explosions due to a flame traveling down the tube 228 from cell to cell. In the present invention, the piston 34 covering the port 54 in each cell creates a substantial, mechanical, and permanent seal that prevents hydrogen from within the battery cell from exiting through the device 10 into the tubing 28. Moreover, water may remain in the tubing 28 if desired so that there is no reasonable condition under which a hydrogen flame path can be sustained between cells off of the same tubing 28. This is a great commercial advantage in dangerous applications such as coal mining.

The above description is not intended to limit the invention to such disclosure, it being understood that changes and modifications may be incorporated within the scope of the appended claims.

What is claimed is:

1. A device for filling a container with supply liquid to a predetermined level, said device having upper and lower ends and comprising:

a cylinder having an inner wall;

a piston moveable within said cylinder between a rest position and a fill position, said piston having a first end and a second end spaced from said first end, said first and second piston ends each having a seal member moveably sealable with said cylinder inner wall;

a biasing member to urge said piston towards said rest position;

an inlet in fluid communication with said first piston end to allow the supply liquid to be introduced to said first piston end;

a fill port through said cylinder wall through which the supply liquid exits said cylinder for filling said container, said fill port positioned to be below said seal member of said first end of said piston when said piston is in said rest position and above said seal member of said first end of said piston and in fluid communication with said inlet when said piston is in said fill position;

a sweep chamber in which said second end of said piston sealingly moves as said piston moves between said rest and fill positions;

a fluid port through which liquid in the container can enter said sweep chamber, said fluid port having an internal end fluidly connected to said sweep chamber and an external end open to the outside of said device, said outer end positioned to be at the predetermined level when the device is installed in said container; and a valve for closing said fluid port in response to movement of said piston towards said fill position.

2. A device in accordance with claim 1 wherein said valve comprises a shaft attached to and moving with said piston and a valve seal member.

3. A device in accordance with claim 2 wherein said valve seal member is attached to and moves with said shaft, said valve seal member capable of closing said port.

4. A device in accordance with claim 3 wherein said shaft is moveable into said fluid port, and wherein said fluid port has a conduit having a cross sectional area sized to maintain a seal with said valve seal member when in contact therewith and a port section between said conduit and said external end having a cross sectional area greater than that of said conduit to prevent a seal with said seal member when said seal member moves beyond said conduit towards the fill position.

5. A device in accordance with claim 4 wherein said fluid port section has grooves to increase its cross sectional area.

6. A device in accordance with claim 4 wherein said port conduit has a diameter less than a diameter of said cylinder.

7. A device in accordance with claim 3 wherein said shaft has a diameter less than a diameter of said piston, and said port has a diameter less than a diameter of said cylinder.

8. A device in accordance with claim 2 wherein said shaft is rod like and comprises a valve seal for sealingly engaging said port to close said valve.

9. A device in accordance with claim 1 wherein said fill port is positioned to be above said second end of said piston when said piston is in said rest position.

10. A device in accordance with claim 1 wherein said biasing member comprises a spring.

11. A device in accordance with claim 1 further comprising a housing attached to said cylinder, said inlet being disposed in said housing.

12. A device in accordance with claim 1 wherein said fluid port end comprises a filter.

13. A device in accordance with claim 1 further comprising U-cup seals attached to said piston for moveably sealing said first and second piston ends with said cylinder inner wall.

14. A device in accordance with claim 1 wherein said valve comprises a ball positioned to close said port.

15. A device for filling a container with supply liquid to a predetermined level, said device having an upper and lower end and comprising:

a cylinder having an inner wall;

a piston moveable within said cylinder between a rest position and a fill position, said piston having a first end and a second end spaced from said first end, said first and second piston ends being moveably sealable with said cylinder inner wall;

a biasing member to urge said piston towards said rest position;

an inlet in fluid communication with said first piston end to allow the supply liquid to be introduced to said first piston end;

at least one fluid port through said cylinder wall, said fill port positioned to be below said second end of said piston when said piston is in said rest position and above said first end of said piston and in fluid communication with said inlet when said piston is in said fill position;

a sweep chamber in which said second end of said piston sealingly moves as said piston moves between said rest and fill positions, said fluid port being in fluid communication with said sweep chamber when said piston is in the rest position.

16. A method of filling a container with liquid to a predetermined level, said method comprising the following steps:

(a) introducing supply liquid under pressure to one end of a piston, said piston starting from a rest position;

(b) moving said piston to a fill position;

(c) opening a fill port in response to step (b) through which liquid from step (a) enters said container;

(d) reducing the pressure on the filling fluid being added in step (a);

(e) moving said piston back to said rest position;

(f) closing said fill port;

(g) drawing fluid from the container during step (e), if the fluid drawn is substantially gas then proceeding with step (h), if the fluid drawn is substantially liquid then proceeding with step (i);

(h) repeating steps (a) through (g);

(i) introducing supply liquid under pressure to said one side of said piston to urge said piston downward; and (j) trapping said liquid from step (g) against a second end of said piston thereby stopping said piston from moving to said fill position.

17. The method of claim 16 wherein said piston moves within a cylinder, step (g) comprises drawing fluid through a fluid port into said cylinder, and step (j) comprises closing said fluid port to trap said liquid from step (g).

18. A method in accordance with claim 17 wherein the step of closing said fluid port of step (j) includes moving a valve seal member into said port.

19. A method in accordance with claim 17 further comprising the step of (b)(1) compressing gas within said cylinder during step (b) by closing said fluid port.

20. A method in accordance with claim 19 further comprising the step of releasing the compressed gas during step (b) after step (b)(1) by opening said fluid port.

21. A method in accordance with claim 17 wherein said fluid port is closed by being covered by said piston.

22. A method in accordance with claim 16 wherein step (e) comprises use of a spring for moving said piston.

23. A method in accordance with claim 16 further comprising the step of filtering the fluid being drawn in step (g).

24. A method in accordance with claim 16 wherein step (e) comprises use of a vacuum for moving said piston.

25. A device for filling a container with supply liquid to a predetermined level, said device having upper and lower ends and comprising:

a cylinder having an inner wall;

a piston moveable within said cylinder between a rest position and a fill position, said piston having a first end and a second end spaced from said first end, said first and second piston ends each having a seal member moveably sealable with said cylinder inner wall;

an inlet in fluid communication with said first piston end to allow the supply liquid to be introduced to said first piston end;

a fill port through said cylinder wall through which the supply liquid exits said cylinder for filling said container, said fill port positioned to be below said seal member of said first end of said piston when said piston is in said rest position and above said seal member of said first end of said piston and in fluid communication with said inlet when said piston is in said fill position;

a sweep chamber in which said second end of said piston sealingly moves as said piston moves between said rest and fill positions;

a fluid port through which liquid in the container can enter said sweep chamber, said fluid port having an internal end fluidly connected to said sweep chamber and an external end open to the outside of said device, said outer end positioned to be at the predetermined level when the device is installed in said container; and a valve for closing said fluid port in response to movement of said piston towards said fill position.

26. A device in accordance with claim 25 further comprising means for urging said piston towards said rest position.

* * * * *

UNITED STATES PATENT AND TRADEMARK OFFICE
CERTIFICATE OF CORRECTION

PATENT NO. : 6,095,206
DATED : August 1, 2000
INVENTOR(S) : William E. M. Jones

It is certified that error appears in the above-identified patent and that said Letters Patent is hereby corrected as shown below:

Drawings,
Figure 6C, reference numeral "138" should read -- 136 --;

Column 1,
Line 51, amend "energy of an water" to read -- energy of a water --;

Column 2,
Line 61, amend "FIG. 1B is a cross sectional view of the device of FIG. 1" to read -- FIG. 1B is a cross sectional view of the device of FIG 1A --;
Line 63, amend "FIG. 1C is a cross sectional view of the device of FIG. 1" to read -- FIG. 1B is a cross sectional view of the device of FIG 1A --;

Column 3,
Lines 30-31, amend "similar to that of FIG. 1 having" to read -- similar to that of FIG. 1A having --;
Line 48, amend "understood that device" to read -- understood that the device --;

Column 4,
Line 19, amend "liquid exhaust port 48" to read -- liquid fill port 48 --;
Line 23, amend "the exhaust port 48" to read -- the fill port 48 --;

Column 7,
Line 11, the words "FIGS. 3A to 3D" should start a new paragraph;
Line 46, amend "The 'open-close-open' designs are believed to be have" to read -- The "open-close-open" designs are believed to have --;

Column 8,
Line 4, amend "out the pot of the" to read -- out the port the --;
Line 30, amend "(see exhaust port 48a" to read -- (see fill port 48a --;
Line 36, amend "exhaust port 48a in the fill position." to read -- fill port 48a in the fill position. --;
Line 37, amend "the exhaust port 48" to read -- the fill port 48 --;
Line 59, amend "reduce to allow the piston" to read -- reduced to allow the piston --;

Column 9,
Line 11, amend "exhaust port 48" to read -- fill port 48 --;

Column 12,
Line 3, delete "the";
Line 13, amend "prevent of carbon dioxide" to read -- prevent carbon dioxide --;
Line 32, amend "tube 228" to read -- tube 28 --;

UNITED STATES PATENT AND TRADEMARK OFFICE
CERTIFICATE OF CORRECTION

PATENT NO.    : 6,095,206
DATED         : August 1, 2000
INVENTOR(S)   : William E. M. Jones It is certified that error appears in the above-identified patent and that said Letters Patent is hereby corrected as shown below:

Column 13,
Line 18, amend "said port" to read -- said fluid port --;

Column 14,
Lines 1-2, amend "said fill port" to read -- said fluid port --;
Line 20, step (d), amend "the filling fluid" to read -- the supply liquid --;
Lines 29-30, step (i), amend "said one side" to read -- said one end --;

Column 16,
Lines 2-3, amend "said outer end" to read -- said external end --.

Signed and Sealed this

Twenty-eighth Day of January, 2003

JAMES E. ROGAN
*Director of the United States Patent and Trademark Office*